No. 803,141. PATENTED OCT. 31, 1905.
H. TABOR.
TRANSMISSION MECHANISM.
APPLICATION FILED DEC. 24, 1903.
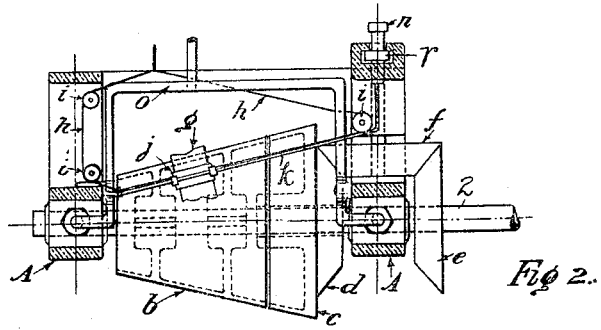
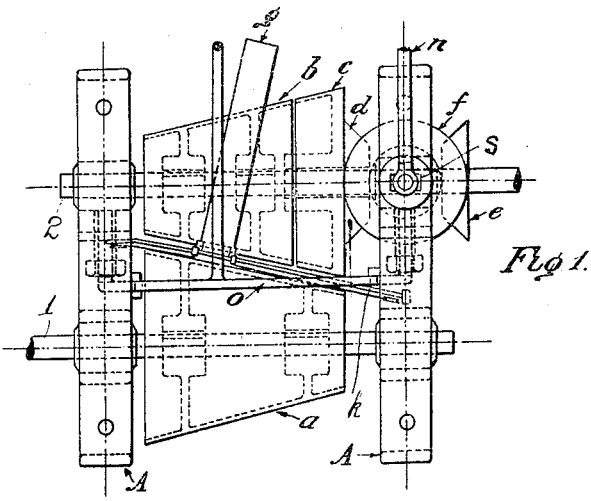
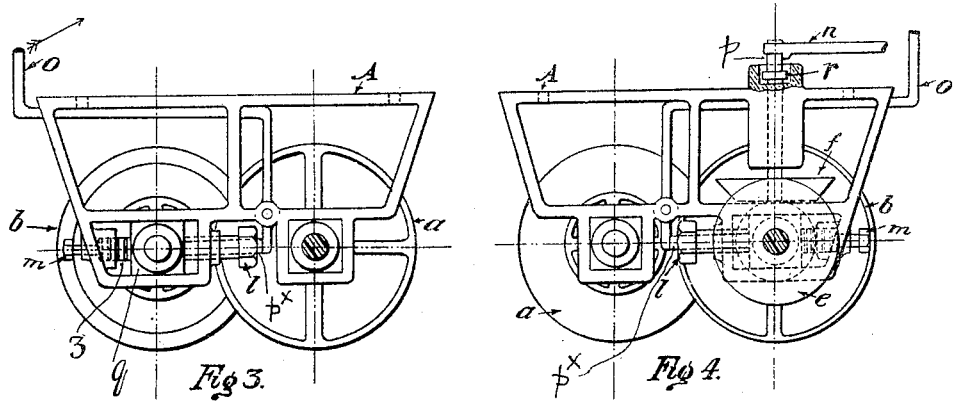

UNITED STATES PATENT OFFICE.

HARRIS TABOR, OF ELIZABETH, NEW JERSEY, ASSIGNOR OF ONE-HALF TO ANGUS SINCLAIR, OF EAST ORANGE, NEW JERSEY.

TRANSMISSION MECHANISM.

No. 803,141. Specification of Letters Patent. Patented Oct. 31, 1905.

Application filed December 24, 1903. Serial No. 186,503.

*To all whom it may concern:*

Be it known that I, HARRIS TABOR, a citizen of the United States, and a resident of Elizabeth, in the county of Union and State of New Jersey, have invented a certain new and useful Improvement in Transmission Mechanism, of which the following is a specification.

This invention relates to mechanism primarily intended for driving a part, as a shaft, at variable speed in either direction, and includes a plurality of driven cone members all having the same axis of motion, but not all fast to the same shaft, a driver cone member, and a shiftable connector for transmitting power or motion to one or another of the first-mentioned cone members, according to the position of such transmitter or connector.

It also includes the combination, with the above-mentioned mechanism, of means whereby the driven cone members transmit opposite motions to one and the same part.

It also includes a plurality of end-to-end cone members not all fast to the same shaft or part, a driver cone member, a transmitter, means for moving said driver and driven members apart, and means for yieldingly holding them together, whereby the pressure or tension on the transmitter may be varied.

Other features and combinations are also included within the invention, all as hereinafter described, and more particularly pointed out in the appended claims.

It will be understood, of course, that for some purposes the functions of the driver and the driven members may be inverted. The driver and driven cone members may have straight or curved sides, according as it is desired to have the speed change at a uniform or a variable rate as the transmitter is moved along said members. The transmitter may be external to both the driven and the driver elements, though it is preferred to have it pass between them. Various forms of transmitters may be employed; but it is preferred to use a friction-belt which passes between the cones and about but one of them, as the driver-cone. It is not essential that in all cases the axes of the driver and the driven members be parallel. A clutch or other disconnecting means is employed in connecting the driven cone member which is loose on the shaft with that shaft, so as to connect and disconnect the same during the operation of the mechanism.

One embodiment of the invention is illustrated in the accompanying drawings, forming part hereof, in which—

Figure 1 is a plan view, Fig. 2 is a side elevation, and Figs. 3 and 4 are end elevations, all as arranged in frames adapted for attachment to the under side of a wagon-body or an overhead structure.

Referring to the drawings, the reference A marks suitable frames in which the movable parts are mounted in appropriate manners, said frames being provided with bolt-holes, whereby they may be attached to the framework of a wagon or other wheeled vehicle or to the framework of a building, a vessel, &c., said frames being rigidly connected together in such cases, as will be understood.

The reference-numeral 1 marks a drive-shaft on which is the driver-cone $a$, and the reference-numeral 2 marks a driven shaft on which are the fast cone $b$ and a loose cone $c$, preferably arranged as shown. The cone $c$ has a mitered or bevel gear or friction member $d$ rigidly secured thereto, and a similar gear or member is fast on the shaft 2.

The reference-letter $f$ marks a gear or friction member adapted to transmit motion from the gear or member $d$ to the gear or member $e$ whenever said gear or member $f$ is down in the position thereof shown in the drawings. The shaft $p$, on which the gear or member $f$ is mounted in any suitable manner to have motion of rotation only, is arranged to have endwise motion for the purpose of moving the gear or member $f$ into and out of mesh or contact with the gears or members $d$ and $e$, whereby the gear or member $e$ and the shaft to which it is fast are driven in one direction by the cone $b$ and in the reverse direction by the cone $c$ and the described connections therefrom to the shaft 2, the cones $b$ and $c$ being driven in the same direction.

The transmitter of motion from the driver-cone $a$ to the cones $b$ and $c$ (shown in the drawings) consists of a belt $g$, which passes about the driver $a$, as in the so-called "Evans cone transmission," and its shifter. The belt $g$ is moved edgewise by a traveler $j$, which runs along a guide-rod $k$ and which is moved back and forth by cords $h$, which run on pulleys $i$.

The shaft 2 may be and preferably is mounted so as to be capable of motion toward and from the shaft 1, its motion toward shaft 1 being limited, if desired, by adjustable stops $l$, coil or other suitable springs 3 being employed to press the shaft 2 toward the shaft 1. Adjustable screws $m$ may be used for the purpose of varying the tension of the said springs 3.

For the purpose of throwing off power quickly without moving the belt $g$ means are provided for moving the shaft 2, with its cones, away from the shaft 1, thus decreasing the pressure upon the belt $g$ in any desired degree. The means shown in the drawings for accomplishing this purpose consist of a forked lever $o$, which is fulcrumed on the frames A and slides $p^x$, which pass freely through the screws $l$, said screws being made hollow for this purpose, and abut against the movable journal-boxes $q$, in which the shaft 2 is journaled, and which are arranged to slide in the frames A. By pressing on the lever $o$ in the direction indicated by the arrow the boxes $q$ and shaft 2 are moved away from the shaft 1, and the pressure upon the belt $g$ may be decreased to such an extent that the shaft 2 and parts driven thereby may be stopped even though the shaft 1 continues to revolve.

The reference-letter $n$ marks a handle, which is secured in any suitable manner to the shaft $p$, on which the gear or friction member $f$ is secured, as above described. The shaft $p$ has lugs or ears $r$ thereon, which in one position of the shaft $p$ may pass through the oblong slot $s$ in the box in the frame A and which in another position of the shaft $p$ will not pass through said slot, whereby the gear $f$ may be moved into and out of working position at will, and thus connect and disconnect the cone $c$ and the shaft 2.

When the belt $g$ is between the cones $a$ and $b$, the shaft 2 is driven in one direction, and when that belt is between the cones $a$ and $c$ and the gear or friction member $f$ is down between the gears or members $d$ and $e$ the shaft 2 is driven in the opposite direction. By moving the lever $o$ in the direction of the arrow the shaft 2 may be moved away from the shaft 1 until no motion is transmitted to the driven shaft.

What is claimed is—

1. The combination of independently-movable driven cone members, a movable part, means whereby said driven members transmit opposite motions to said part, a driver cone member, and a transmitter connecting and shiftable along said members.

2. The combination of independent driven cone members, with a driver cone member, means for yieldingly pressing said driver and driven members toward each other, means for moving said driver and driven members apart, and a transmitter connecting and shiftable along said members.

3. The combination of independent driven cone members, means whereby said members transmit opposite motions to the same part, said part, a driver cone member, and a transmitter connecting and shiftable along said cone members, with means for yieldingly pressing said driver and driven members toward each other, and means for moving them apart.

4. The combination of a shaft, a cone member fast thereon, a cone member loose thereon, a driver cone member, and a shiftable transmitter for connecting said driver and said fast and loose cone members, with means for connecting said loose cone member with and disconnecting it from said shaft to drive it in reverse directions from that in which it is driven by said fast cone member.

5. The combination of driver and driven cone members having non-intersecting axes and spring-pressed toward each other, with lever-operated means for moving them apart.

6. The combination with driver and driven cone members spring-moved toward each other, tubular adjustable stops for limiting such motion, sliding bolts passing through said tubular stops, and means for actuating said bolts to spread apart said cone members, with a motion-transmitter intermediate said cone members.

Signed at New York, in the county of New York and State of New York, this 14th day of December, A. D. 1903.

HARRIS TABOR.

Witnesses:
 FRANK RYALL,
 RICHARD W. BARKLEY.